United States Patent [19]

Biswas et al.

[11] Patent Number: 5,028,798
[45] Date of Patent: Jul. 2, 1991

[54] METHOD AND APPARATUS FOR DETERMINING THE GEOMETRY OF A BODY

[75] Inventors: Amit K. Biswas, Kaarst; Paul-Joseph Nieschwitz, Aachen; Hans A. Schubert, Duesseldorf, all of Fed. Rep. of Germany

[73] Assignee: SMS Hasenclever GmbH, Dusseldorf, Fed. Rep. of Germany

[21] Appl. No.: 422,557

[22] Filed: Oct. 17, 1989

[30] Foreign Application Priority Data

Oct. 18, 1988 [DE] Fed. Rep. of Germany ....... 3835417

[51] Int. Cl.$^5$ ............................................. G01N 21/86
[52] U.S. Cl. ...................................... 250/560; 356/385
[58] Field of Search ................ 250/560, 561; 356/376, 356/384–387

[56] References Cited

U.S. PATENT DOCUMENTS

| | | |
|---|---|---|
| 3,749,500 | 7/1973 | Carlson et al. |
| 4,264,208 | 4/1981 | Haberl et al. ........................ 356/376 |
| 4,425,505 | 1/1984 | Jones et al. .......................... 356/385 |
| 4,737,031 | 4/1988 | Mahlberg et al. ................... 356/385 |
| 4,752,964 | 6/1988 | Okada et al. ........................ 356/376 |
| 4,880,991 | 11/1989 | Boehnlein et al. .................. 250/560 |

FOREIGN PATENT DOCUMENTS

| | | | |
|---|---|---|---|
| 56-138207 | 10/1981 | Japan ................................... 356/385 |
| 59-183312 | 10/1984 | Japan ................................... 356/385 |
| 2121956 | 1/1984 | United Kingdom . |
| 2138562 | 10/1984 | United Kingdom . |
| WO84/02770 | 7/1984 | World Int. Prop. O. . |

Primary Examiner—Davis L. Willis
Assistant Examiner—Khaled Shami
Attorney, Agent, or Firm—Fleit, Jacobson, Cohn, Price, Holman & Stern

[57] ABSTRACT

Method and apparatus for determining the geometry of a workpiece in a forging press, fed into the forging press for processing in a processing throughpass and rotated about the longitudinal axis in predetermined manner. The surface of the workpiece is scanned over the periphery, in planes perpendicular to the direction of displacement of the workpiece. The data scanned are transmitted to a prepared programmed computer, and subsequently converted in the computer, with the aid of a program based on the condition of volume constancy, in such a way that the actual geometry of the workpiece is determined. The determined actual geometry is processed in the computer in such a way that a further deformation step, with predetermined programmed forging parameters, is initiated. The apparatus has a support in the shape of a ring, arranged in the vicinity of the processing region of the workpiece and on a mounting in such a way as to rotate around the workpiece at a determined speed. Installed on the inner surface of the ring are arranged adjacently, at two or more places, beam emitters and beam receivers for carrying out the scanning.

17 Claims, 3 Drawing Sheets

METHOD AND APPARATUS FOR DETERMINING THE GEOMETRY OF A BODY

BACKGROUND OF THE INVENTION

The invention relates to a method and an apparatus for determining the geometry of a metallic workpiece in a forging press for a processing throughpass wherein the workpiece is fed into the forging press for processing and is rotated about the longitudinal axis in predetermined manner.

German Patent Specification No. DE 37 23825 A1 discloses a method for elongating a metallic workpiece in a forging press, wherein the workpiece, before the elongation concerned, or before the bite between the upper saddle and the lower saddle of the forging press, is in each case displaced in the direction of elongation of the workpiece only to such an extent—taking into account the elongation of the workpiece measured during the deformation—that the bite edge of the preceding bite, lies on the workpiece between the saddle edges. For measuring the elongation of the workpiece, an extensometer is connected with the workpiece by means of a measuring wire arranged detachably on the free end of the workpiece. This known method and apparatus have the disadvantage that only the elongation of a workpiece can be taken into account during processing with the aid of process control by a process computer, whereas the important alteration of cross section of a workpiece being processed is not taken into account in the process control.

Furthermore, conventional measuring methods are known, wherein the cross section of a workpiece at the supposed end of the processing operation is measured with measuring-tongs. Apart from the inexactitude of such a measuring process, this measuring process is unsuitable for process control of a processing operation and it is also unsuitable for workpieces which are difficult of access.

Furthermore, German Specification No. DE 34 14500 A1 describes a method and a device for measuring the profiles of irregular objects without contact, wherein the profile of the material is conveyed through an optical measuring path which rotates around the material which at least partially interrupts the light beam of the measuring path. The profile shape is determined by defining the interrupted light beam with the aid of suitable means. Thereby, it is true, it is possible to monitor the profile shape and also to adhere to required specifications, however an automatic processing operation is not controllable by this means.

Furthermore, there is known from German Specification No. DE 32 19389 A1 a contactless optoelectric measuring method, for determining non-round cross sections of elongate objects e.g. rolled and extruded profiles, wire etc, and an installation for operating the method, wherein a light beam, which undergoes a parallel displacement motion within a measurement field, is occluded by an object located in the measurement field, for a particular measurable time which is dependent upon the size of the cross section in the direction of scanning. When the orientation of the cross section of the object to be examined is non-variable with reference to the environment, the scanning takes place in several different directions, either by pivoting the entire measuring system about an axis which is parallel to the longitudinal axis of the object, or by collecting measurement values by means of several differently-aligned measuring systems, which then are formed stationarily. This known measuring method take non-round cross sections into account, but it is unsuitable for use during the control of a processing operation.

The object of the invention is to provide a method and apparatus for determining the geometry of a workpiece in a forging press, whereby the cross section of the workpiece is determined in simple manner and can be taken into account in the fully automated process control of a forging operation.

BRIEF SUMMARY OF THE INVENTION

According to the invention, the object is achieved in that, in a manner known per se, the surface is continuously scanned over the periphery, in planes perpendicular to the direction of displacement of the workpiece, that the scanned data are transmitted to a prepared programmed computer, and that the data transmitted are converted in the computer, with the aid of a program based on the volume-constancy condition, in such a way that the actual geometry of the workpiece is determined.

In a preferred development of the invention the respective determined actual geometry is processed in the computer in such a way that a further following deformation step is initiated, with predetermined programmed forging parameters. In this method it is particularly advantageous that the actual geometry of the workpiece is continuously determined, so that this variable can continuously be taken into account during the automatic process control of a forging operation. Thereby it is possible for the fully automated forging of a workpiece to be controlled in optimum manner, in such a way that the workpieces satisfy the most stringent requirements concerning quality, as regards working and exactitude of measurement, at the end of the forging operation.

Preferably, the workpiece is scanned at equally space-apart intervals of time, by two or more uniformly distributed laser beams emitted from beam devices which are constructed in the form of laser tubes, and the geometry of the body over the contour of its surface is determined from the sequence in time of the emission and reception of the laser beams.

The invention is particularly applicable to open-die forging.

Also according to the invention there is provided apparatus for determining the geometry of a workpiece being forged, comprising a support arranged in the vicinity of the processing region of the workpiece, and arranged so as to rotate around the workpiece at a determined speed, and on the inner surface of the support, distributed at two or more places, in each case there are installed adjacently-arranged beam emitters and beam receivers.

The continuous measuring here takes place in a manner which is particularly safe in operation and is not liable to breakdowns, by means of beam emitters and beam receivers which are constructed as laser devices which are arranged on the inner surface of the support, which advantageously is ring-shaped and is arranged so as to be movable or pivotable on a mounting.

Furthermore, the ring is preferably equipped with a cooling installation for itself and the beam emitters and beam receivers.

By means of the contactless measuring system it is achieved that the operation can be performed in a particularly operationally safe manner which is completely free of wear, whereby the highest exactitudes of measurement can be achieved with extremely small measuring times.

BRIEF DESCRIPTION OF THE DRAWINGS

Further advantages and details of the invention are explained in greater detail hereinafter, with reference to embodiment examples illustrated in the accompanying drawings by way of example only wherein.

DETAILED DESCRIPTION

Figure 1:
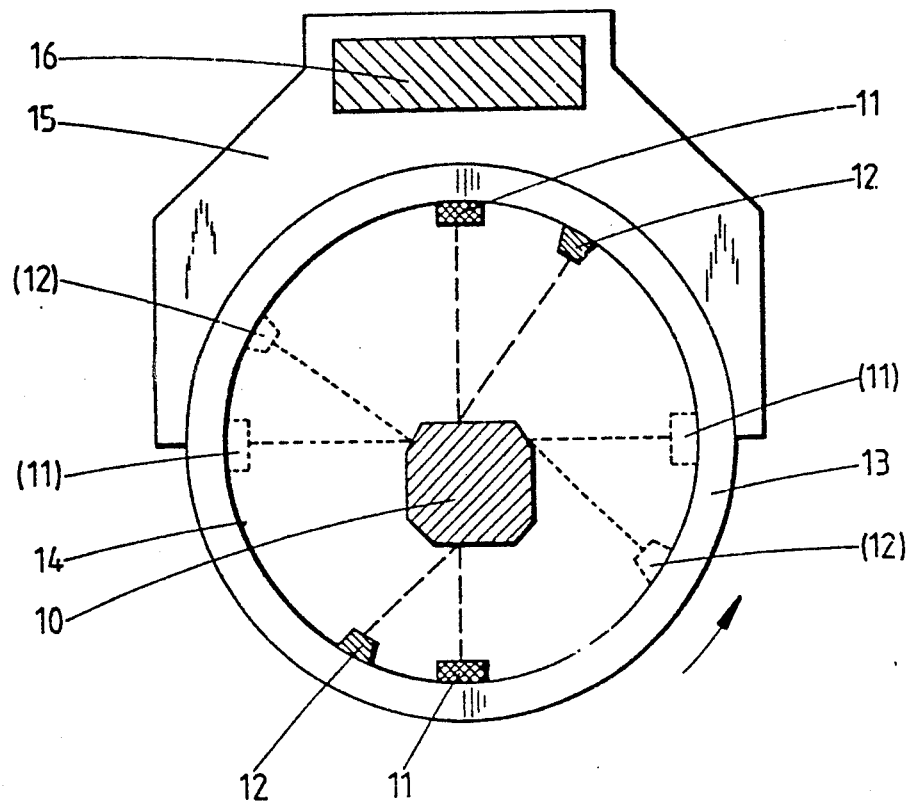
FIG. 1 is a transverse cross-sectional view which shows measuring apparatus according to a first embodiment of the invention.

FIG. 1 shows a support in the form of a ring 13 arranged around a forging workpiece 10 being forged in a forging press. It is not necessary for the workpiece 10 to be arranged centrally, it can also assume an eccentric position relative to the ring 13. On two or more uniformly distributed places on the inner surface 14 of the ring 13, there are installed in each case adjacently-arranged beam emitters 11 and beam receivers 12, advantageously constructed as laser devices. Additional positions for emitter/receiver pairs are shown in broken lines. The laser devices consist essentially of a laser tube which emits the laser beam which is broken where it meets the surface of the workpiece 10 and is thrown back onto the laser receiver.

The ring 13 is arranged so as to rotate around the workpiece 10 at a determined speed, in the direction of the arrow. For this purpose, the ring 13 is arranged on a mounting 15 which is secured movably or pivotably on a support beam 16 of an installation which is not further shown.

Advantageously, the ring 13 may be equipped with a cooling installation for cooling the ring 13, the beam emitters 11 and beam receivers 12, as the measuring device is intended to operate in an environment where there are high temperatures and strong heat radiation from the red-hot forged bodies. The cooling installation may be operated with a cooling medium which preferably consists of compressed air or water.

The use of a simple closed ring as support for the beam emitters and receivers, for example, the ring 13, is advantageous because of its simplicity, but does have the disadvantage that the measuring device cannot be removed in a simple manner, and therefore is liable to be subjected to heat radiation for a relatively long time or even continuously.

Figure 2:
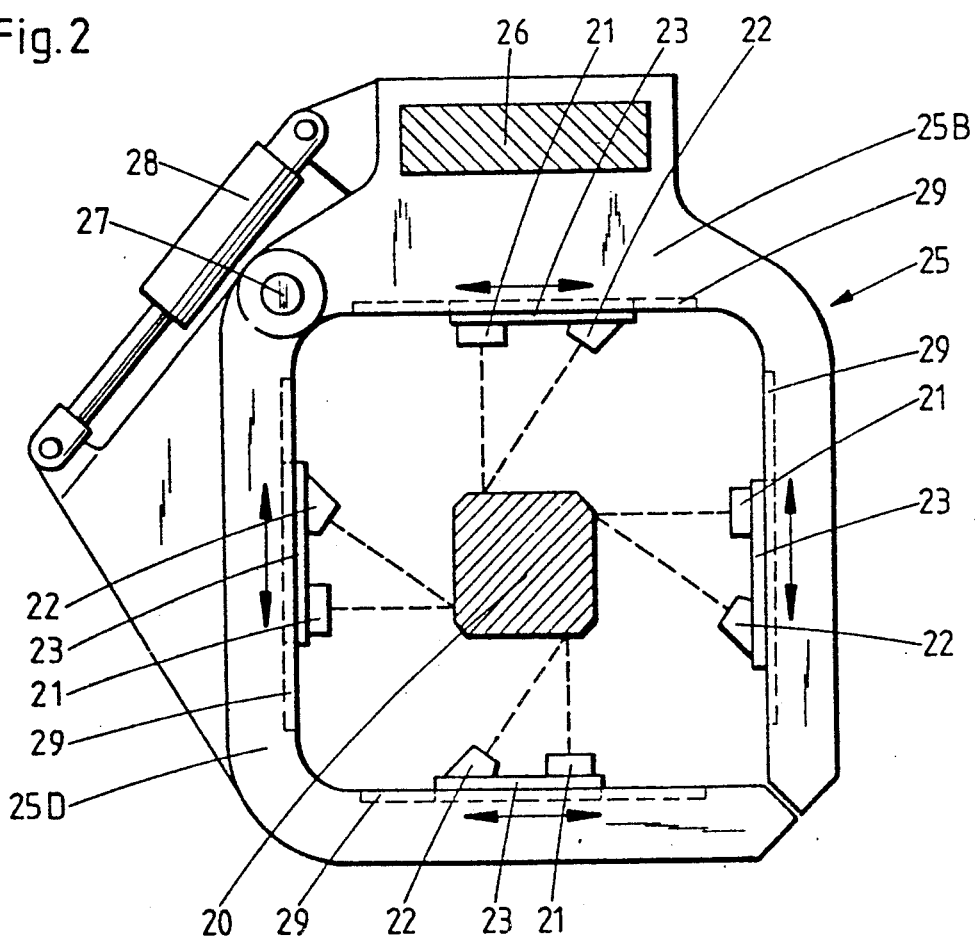
FIG. 2 is a view similar to FIG. 1 which shows measuring apparatus according to a second embodiment of the invention.

In the embodiment shown in FIG. 2, the beam emitters and receivers 21, 22 are carried by an openable support 25 comprising a fixed portion 25B attached to a support beam 26, and a movable portion or closure portion 25d pivotably attached to the fixed portion 25D by a pivot 27. A piston-cylinder unit 28 is coupled to the pivotable portion 25D for pivoting the latter on the fixed portion 25B, so that the support 25 can be set either in the illustrated closed condition in which the workpiece is measured, or with the portion 25D pivoted to an open position in which the measuring device can be removed laterally, so as to be clear of the workpiece and the associated heat radiation, without altering the position of the workpiece in the press or any other components of the press.

The support 25 is provided with slides 23 each of which carries a beam emitter and associated receiver and can move in a respective guide 29 extending along the associated limb of the support 25, which in this embodiment is rectangular. The slides 23 are moved along limbs of the support to effect the scanning of the workpiece by the emitted laser beams. Thus, in this embodiment the scanning movement is a rectilinear translation of the scanning beams, tangential to a circle enclosing the workpiece, in contrast to the rotary scanning movement of the embodiment shown in FIG. 1.

Figure 3:
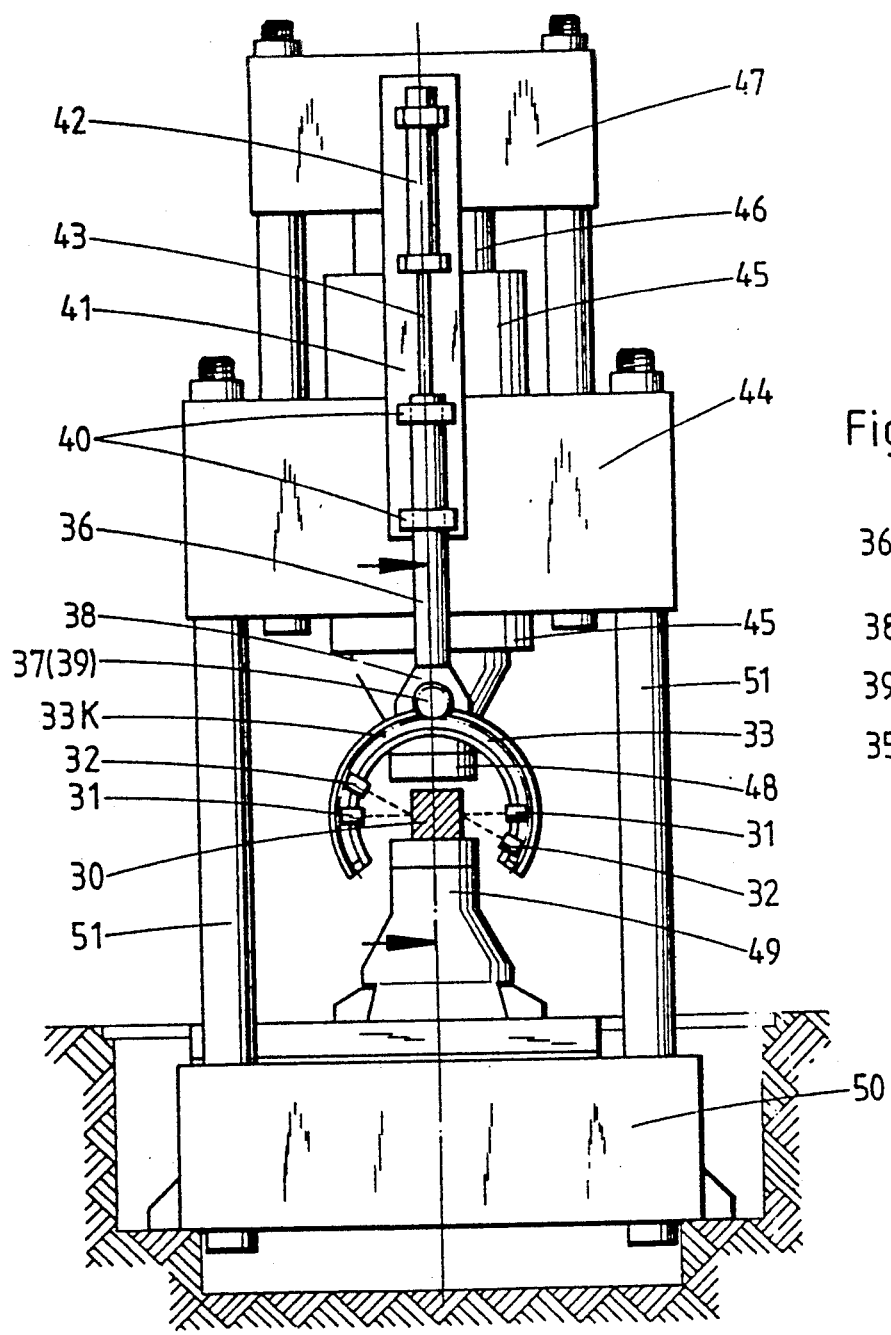
FIG. 3 is an elevational view which shows measuring apparatus according to a third embodiment of the invention, in a forging press.
Figure 4:
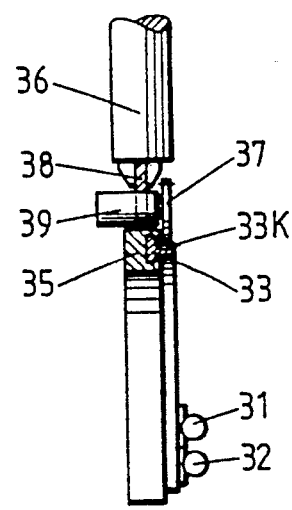
FIG. 4 is an enlarged detailed side view of the measuring apparatus of FIG. 4, partly in cross-section.

Another embodiment of a measuring device which can readily be removed from the region of stress-imposing heat radiation is shown in FIGS. 3 and 4, which also show, by way of example, how the measuring device is associated with a forging press.

In this embodiment, two beam emitters 31 and receivers 32 are carried by a support in the form of an annular sector 33, which does not completely surround the workpiece 30 but extends through only about 240° to 270°, leaving a gap large enough for passage of the workpiece. The sector 33 is rotatably supported in a carrier 35 which, like the sector 33, does not completel encircle the workpiece. The sector 33 is provided with a ring 33k which projects from its seating in the support 35 and is provided with external teeth in mesh with a drive pinion 37 of a motor 39.

The support 35 is carried by a rod 36 connected to the support 35 through a head plate 38 which carries the motor 39.

By the motor driving the toothed ring 33k through the pinion 37, the sector 33 can be rotated in the carrier 35, for scanning the laser beams of the emitters 31 over the periphery of the workpiece. The scanning movement extends, for example, about 90° on both sides of the central initial or rest position shown in FIG. 3, so that the workpiece is scanned in a single measuring cycle over its entire periphery.

The vertical rod 36 is located in guides 40 so that it can slide longitudinally (vertically) but cannot rotate about its axis. The guides 40 are elements of a mounting plate 41 which also carries a cylinder-piston unit 42 of which the piston rod 43 is connected to the rod 36. The plate 41 is mounted on the stationary upper yoke or crosshead 44 of a forging press. Thus, by means of the piston-cylinder unit 42, the measuring device can be raised clear of the workpiece and associated heat radiation.

The illustrated forging press is a moving-cylinder press, that is to say, a movable cylinder 45 is guided in the upper yoke or crosshead 44 and accommodates piston 46 which abuts on a top bridge or crosshead 47 so that when the cylinder is pressurized, the cylinder, and an upper forging tool 48 carried at its lower end, are urged downwards towards a lower tool 49 in order to forge the workpiece between these tools. The lower tool 49 is fasten to a bottom yoke or crosshead 50 connected by columns 51 to the upper yoke or crosshead 44.

It is desirable to provide a measuring device on each side of the press, so that the entry cross-section $A_M$ and the exit cross-section $A_{M+1}$ can be measured. The provision of two measuring devices on opposite sides of the press is particularly significant, if the press co-operates with two manipulators which work in both directions of passage or feed, each measuring device measuring either the entry cross-section or the exit cross-section, depending on the direction of feed movement of the workpiece.

From the time sequence of the emission and reception of the laser beams, in conjunction with the current rotational or rectilinear position setting of the emitters and receivers, the contour of the measured cross-section is determined, and the size (area content) of the cross-section is determined by planimetry, in a first computation step.

Equipment and software for suitably effecting contactless measurement of the workpiece and consequential computation of its dimensions and/or shape are known to those skilled in the art and accordingly will not be further described herein. Contactless measurement methods and apparatus are described, for example, in the previously mentioned German patent specification Nos. 34 14500 and 32 19389, by way of example.

The result of a measurement carried out behind the press on the workpiece which has just been deformed is, in a second stage of calculation, related to a measurement which was performed before the deformation step and which is derived directly from a measuring result or is taken from a storage memory of preceding measuring results. In connection with the initial length, which results from the first length ($l_x$) laid onto the forging tool, and the sum of the manipulator feeds ($S_{m1}$ to $S_{mn}$) of the forging process, and which is determined in a computer which processes the process data, the new actual length of the workpiece is calculated from the ratio of the cross sections, in a program based on the volume-constancy condition. In the intervals of the cross section measurements, their actual results (cross section size, main measurements, i.e. height, width and/or diameter) are correlated with the sections of the actual length, and thus provide the actual geometry of the workpiece, which can be received in a data memory and/or documented on a display screen or by being printed out.

In addition to being suitable for the checking of results, the documentation of the actual geometry of the workpiece is suitable for providing basis values for subsequent forging processes, which when fed into the calculator can serve for automatic process control.

Figure 5:
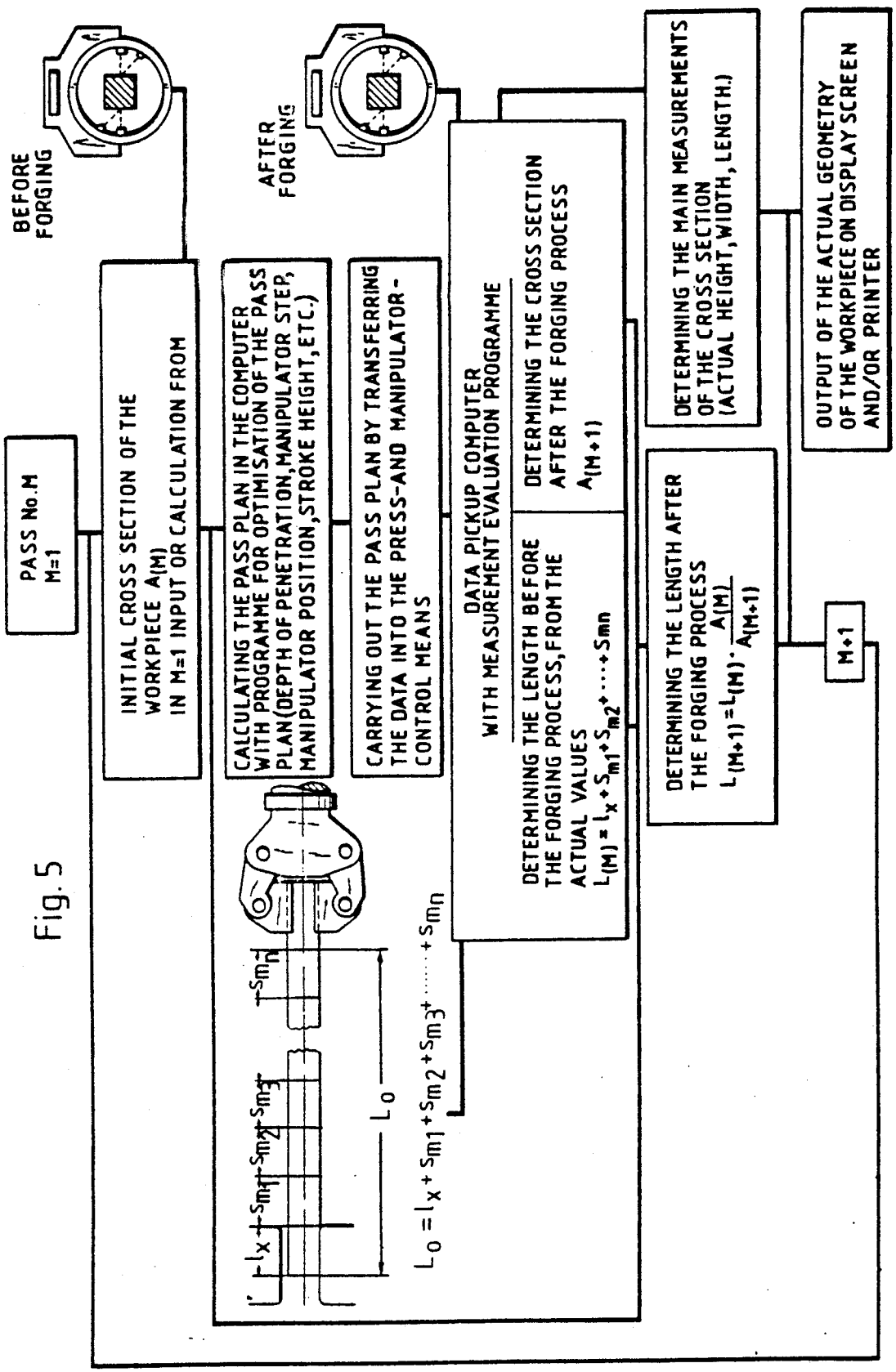
FIG. 5 is a flow diagram.

The flow diagram according to FIG. 5 explains the automatically controlled course of the process, starting out from a first throughpass of the workpiece with the Pass No. M=1. On the basis of the initial cross section $A_{(M)}$, which is fed in for the first pass or which is determined by a preliminary cross section measurement, the calculation of the pass plan is performed in a computer which is programmed for optimising the pass plan. By means of the optimization program. For the pass plan, in particular the depth of penetration of the tool into the workpiece, the size of the manipulator feed step, and the manipulator position, are set in such a way that within several successive forging throughpasses, the most uniform possible distribution of the alteration of shape and, consequent thereon, a good through-forging of the workpiece, is achieved, as is known from the mentioned DE-37 23 825 A1 (FIG. 6). The data pre-given by the pass plan are sent, for effecting the latter, to the press- and manipulator-control means. By means of a data-evaluation computer there is determined, from the actual values of the manipulator steps $S_{m1}$ to $S_{mn}$ together with the value $l_x$, the actual value of the deformed initial length $L_1$, and furthermore, from the cross section detection, the average value of the cross sections $A_2$ after the deformation in the first throughpass. From the ratio of the cross section $A_1$ to the average value of the cross section $A_2$, the length $L_2$ after the first throughpass is calculated, on the basis of the volume-constancy condition, from the initial length $L_1$. Together with the cross section determinations $A_2$, there results the actual geometry of the workpiece after the first throughpass. These data which characterize the geometry are used as basis data for the next-succeeding throughpass (Pass No. (M+1)), and furthermore they can be depicted on a display screen or documented by a printer, in which case the cross sections A can be indicated as individual values and/or as average value. Since in each throughpass one starts out from the actual geometry, summation of errors from several throughpasses is excluded, and this results in high quality and exactitude of measurement. Furthermore, the possibility is given of using deviations of the actual values from the nominal values on which the pass plan calculation is based, for correction of the program.

We claim:

1. A method of determining the actual geometry of an elongate metallic workpiece deformed in a processing throughpass through a forging press wherein the workpiece is fed longitudinally and stepwise through the forging press and is rotated in a predetermined manner about the longitudinal axis extending in the feeding direction, comprising:

initially determining the geometry of the workpiece in terms of a plurality of cross sections distributed along the length of the workpiece prior to entry into the forging press;

determining the fed volume of the workpiece from the product of the known cross section of the workpiece prior to entry into the press and the length of the workpiece fed into the press;

effecting scanning and planimetry of the profile of the workpiece exiting the press, perpendicularly to the feed direction of the workpiece, and determining therefrom the cross section of the workpiece exiting the forging press;

dividing said fed volume by said determined cross section of the workpiece exiting the forging press and determining therefrom the length of the workpiece that has exited the forging press; and determining the actual geometry of the workpiece exiting the press in terms of a plurality of cross sections distributed along the length of the workpiece that has exited the press.

2. A method as claimed in claim 1 and further comprising:

processing said determined actual geometry in a computer in such a way that a further deformation step is initiated, with predetermined programmed forging parameters.

3. A method as claimed in claim 1 wherein:

the workpiece is scanned at equally spaced-apart intervals of time, by two or more uniformly distributed laser beams emitted from beam devices which are constructed in the form of laser tubes.

4. A method as claimed in claim 3, comprising:

determining the geometry of the body over the contour of its surface from the sequence in time of the emission and reception of the laser beams.

5. A method as claimed in claim 4, comprising:
scanning the contour of the surface of the body eccentrically.

6. The method as claimed in claim 1 wherein:
initially determining the geometry of the workpiece comprises effecting measurement of the workpiece prior to forging thereof.

7. The method as claimed in claim 1 and further comprising:
employing said determined geometry of the workpiece exiting the forging press as the initially determined geometry of the workpiece prior to a further entry thereof into the forging press.

8. A method as claimed in claim 4, comprising:
scanning the contour of the surface of the body concentrically.

9. In a forging plant for the forging of an elongate metal workpiece, including a forging press, means for feeding a workpiece longitudinally stepwise through said press and for rotating said workpiece about its longitudinal axis, and control means for controlling the workpiece feeding means and the forging press in dependence on the dimensions of the workpiece after forging, the improvement wherein the control means comprises:
measuring means disposed for scanning the profile of the workpiece exiting the press; and
computing means having an input for receiving output from said measuring means and arranged and adapted for initially determining the geometry of the workpiece in terms of a plurality of cross sections distributed along the length of the workpiece prior to entry into the forging press, determining the fed volume of the workpiece from the product of the known cross section of the workpiece prior to entry into the press and the length of the workpiece fed into the press, effecting scanning perpendicularly to the feed direction of the workpiece and planimetry of the profile of the workpiece exiting the press and determining therefrom the cross section of the workpiece exiting the forging press, dividing said fed volume by the said determined cross section of the workpiece exiting the forging press and determining therefrom the length of the workpiece that has exited the forging press, and determining the actual geometry of the workpiece exiting the press in terms of a plurality of cross sections distributed along the length of the workpiece that has exited the press.

10. Apparatus as claimed in claim 9 wherein:
said measuring means comprises:
at least one beam emitter;
at least one beam receiver for receiving beams emitted by said at least one emitter and reflected by the workpiece;
supporting means for said at least one emitter and receiver; and
cooling means for cooling said at least one beam emitter and receiver and support means therefor.

11. Apparatus as claimed in claim 10 wherein:
said cooling means is acted upon by compressed air or water.

12. Apparatus as claimed in claim 11 and further comprising:
support means in the vicinity of the workpiece for rotation around the workpiece at a determined speed; and
a plurality of beam emitters and beam receivers mounted on the inner surface of said support means in adjacent spaced relationship at at least two uniformly spaced positions.

13. Apparatus as claimed in claim 12, wherein:
said support is constructed in the shape of a ring;
said ring is movably mounted on said press; and
said beam emitters and beam receivers comprise laser devices.

14. Apparatus as claimed in claim 9 and further comprising:
support means in the vicinity of the workpiece in embracing relationship to the workpiece;
guide means at at least two uniformly spaced positions on said support;
slide means mounted on said guide means for translational movement tangentially to a circle encircling the workpiece; and
adjacently arranged beam emitters and beam receivers mounted on respective slide means for movement therewith, for scanning the workpiece profile;
said support means comprising a plurality of portions hinged together, and actuating means for moving said portions between a closed position encircling the workpiece and an open position in which said support means is movable clear of the workpiece.

15. Apparatus as claimed in claim 12 wherein:
said support means comprises an annular sector having a lower region, and an opening in said lower region, a carrier for said annular sector having a lower region and an opening therein, so that said annular sector and carrier only partly encircle the workpiece; and
means are provided for moving said annular sector and carrier transversely relative to the workpiece between a position partly encircling the workpiece and a position clear of the workpiece.

16. Apparatus as claimed in claim 15 wherein:
said carrier is mounted for movement towards and away from the workpiece in guide means provided on a static portion of the forging press.

17. Apparatus for determining the geometry of a metallic workpiece in a forging press for a processing throughpass, wherein the workpiece has a longitudinal axis and is fed into the forging press for processing and rotated about the longitudinal axis in predetermined manner, comprising:
a support arranged in the vicinity of the processing region of the workpiece in embracing relationship to the workpiece;
guides at at least two uniformly spaced positions on said support;
slides mounted on said guides for translational movement tangentially to a circle encircling the workpiece; and
adjacently arranged beam emitters and beam receivers mounted on respective slides for movement therewith for scanning the workpiece profile;
said support comprising a plurality of portions hinged together, and actuating means for moving said portions between a closed position encircling the workpiece and an open position in which said support means is movable clear of the workpiece, so that the surface of the workpiece is continuously scanned over the periphery thereof in planes perpendicular to the feeding direction of the workpiece by said beams from said emitters which are received by said beam receivers to produce scanned data, the scanned data being transmitted to a prepared programmed computer, the computer converting said data, with the aid of a program based on the constant volume condition of the workpiece, so that the actual geometry of the workpiece is determined.

* * * * *